Sept. 6, 1932.  C. W. VAN RANST  1,876,110
AUTOMOBILE CONSTRUCTION
Filed June 8, 1929   4 Sheets-Sheet 1

Inventor
Cornelius W. Van Ranst
By
Attorney.

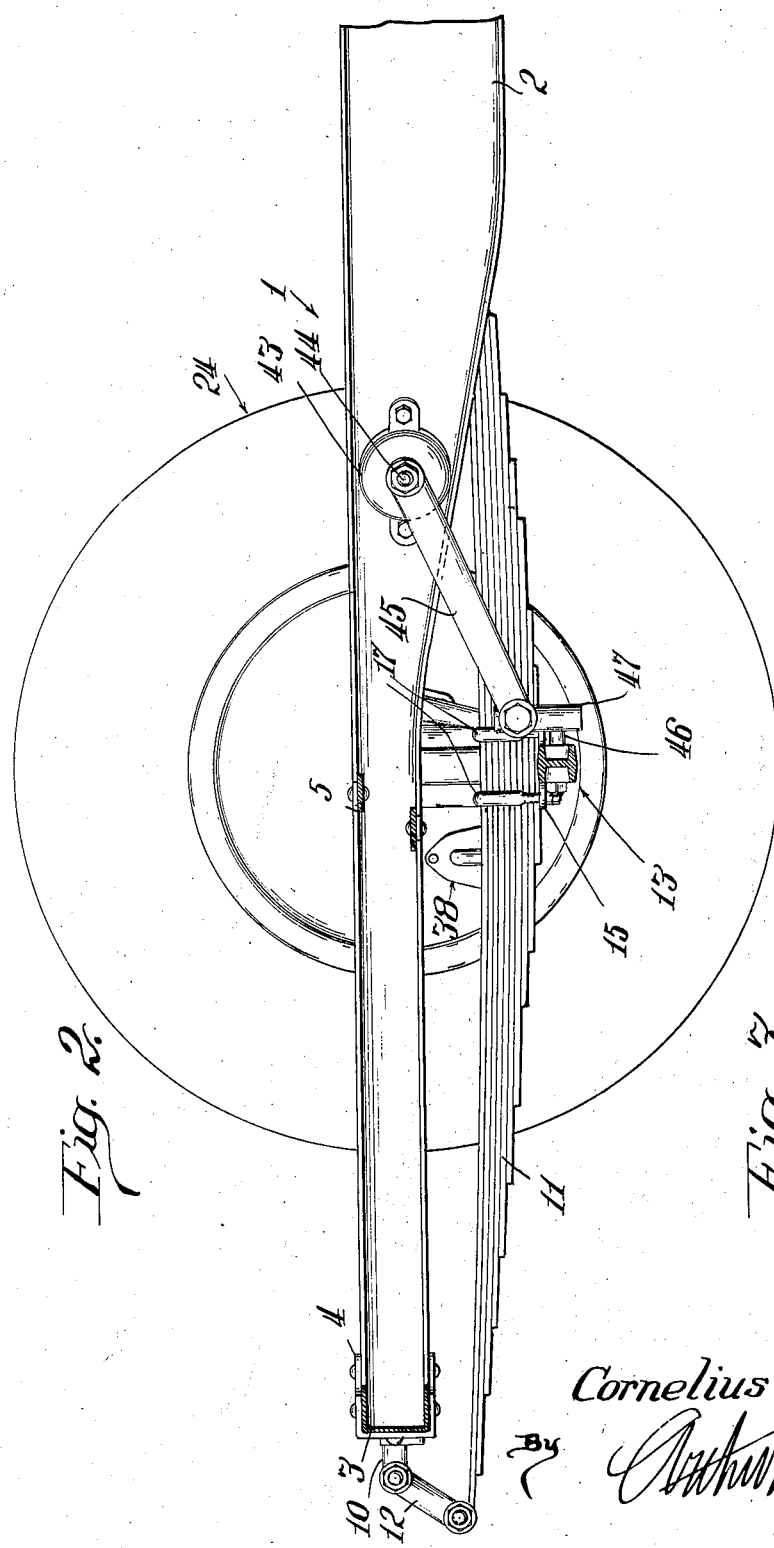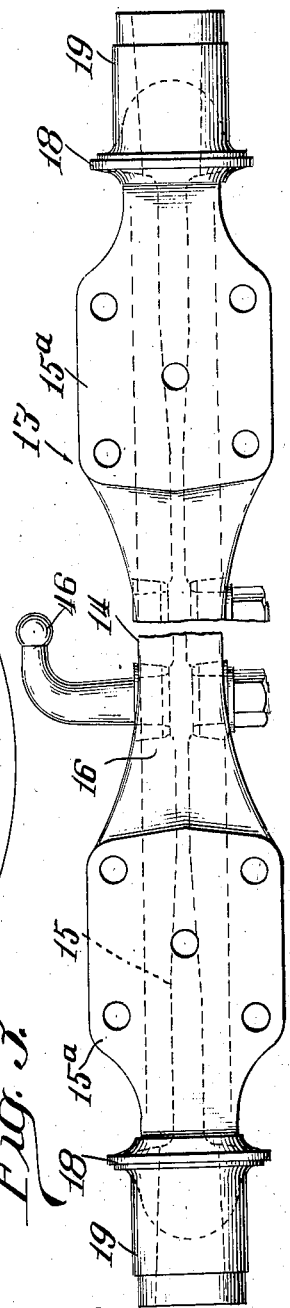

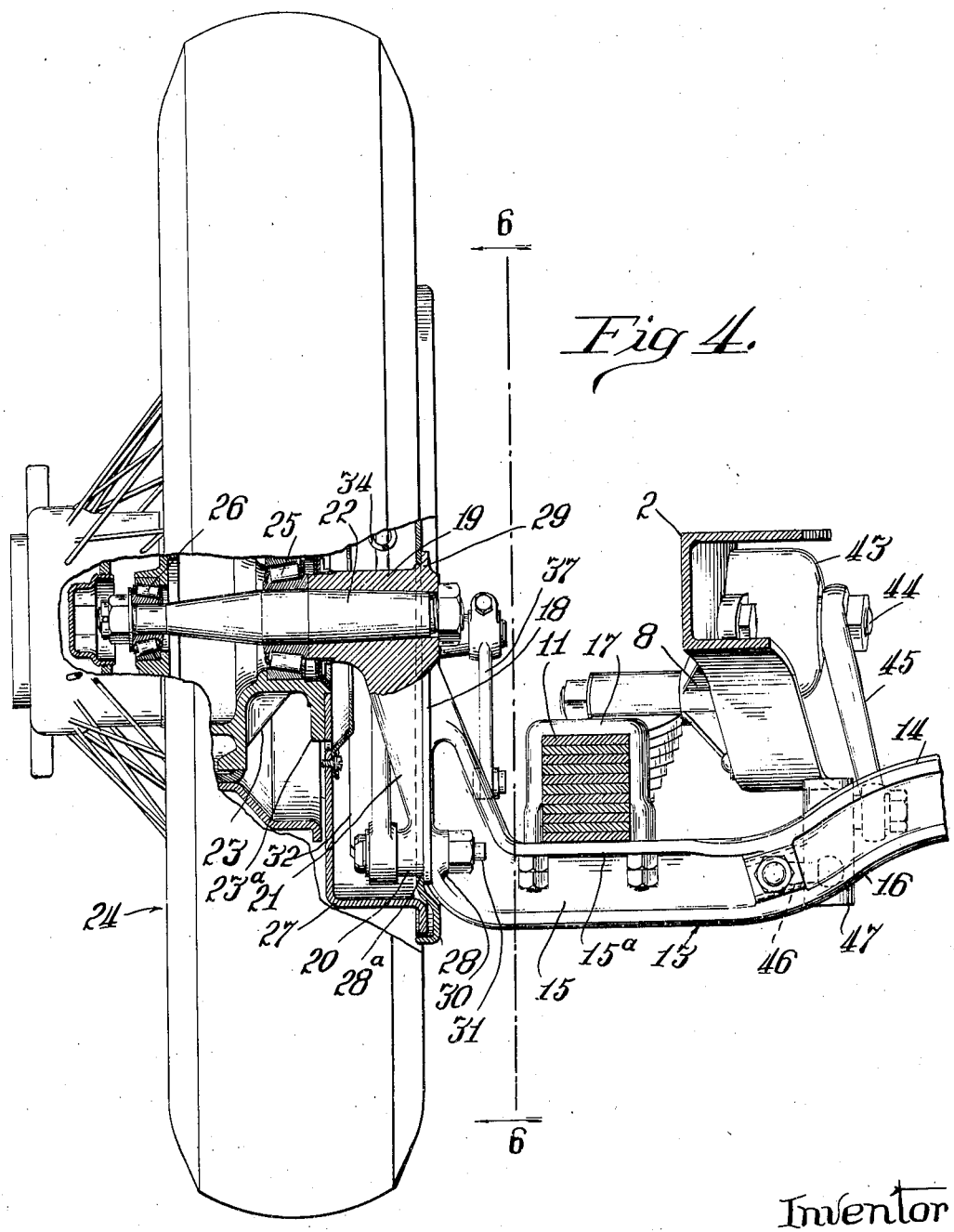

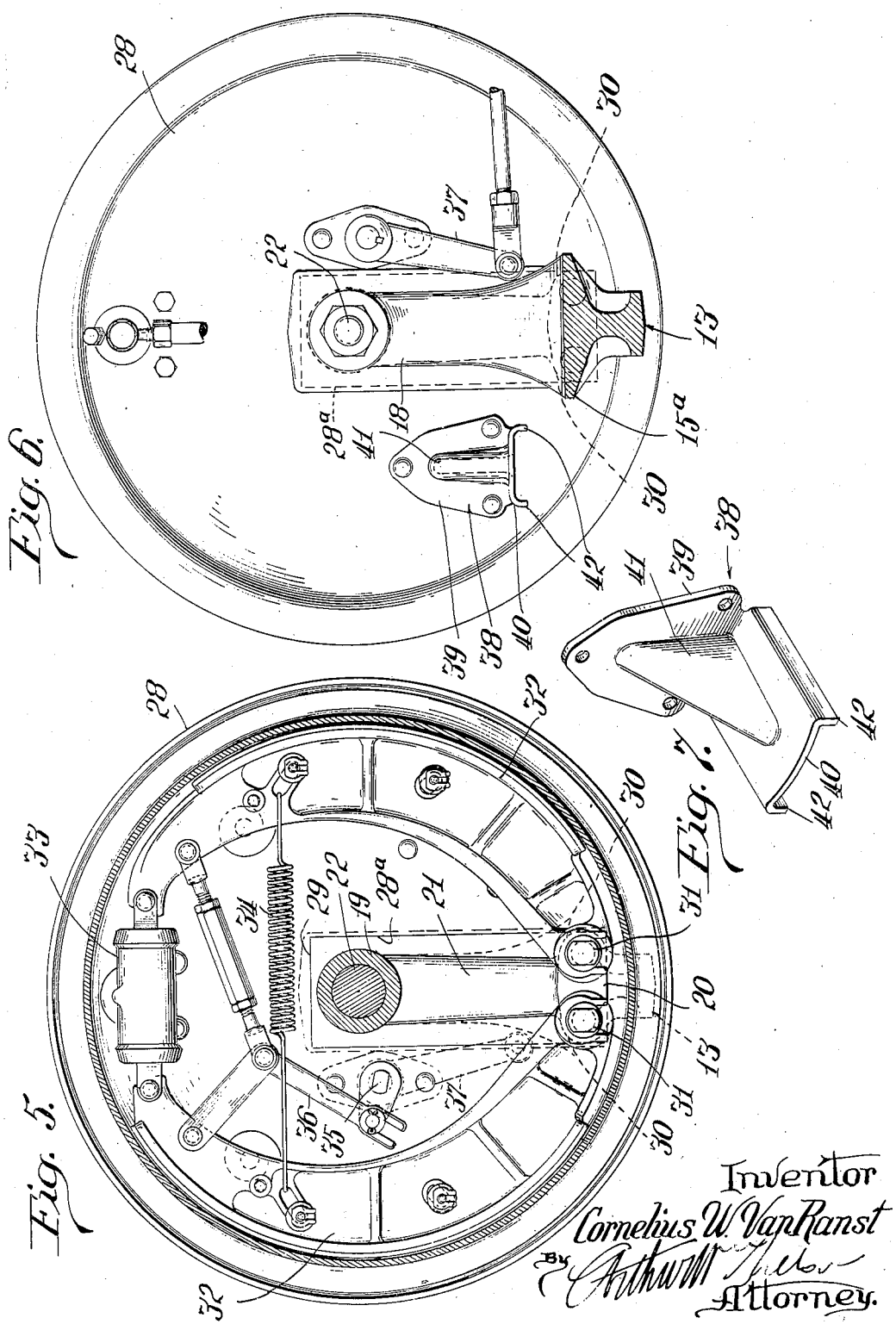

Patented Sept. 6, 1932

1,876,110

UNITED STATES PATENT OFFICE

CORNELIUS W. VAN RANST, OF AUBURN, INDIANA, ASSIGNOR, BY MESNE ASSIGNMENTS, TO MANNING & CO., OF CHICAGO, ILLINOIS, A CORPORATION OF ILLINOIS

AUTOMOBILE CONSTRUCTION

Application filed June 8, 1929. Serial No. 369,283.

This invention relates to improvements in automobile constructions and it consists of the matters hereinafter described and more particularly pointed out in the appended claims.

The invention relates particularly to the rear axle construction for front wheel driven automobiles and the primary object thereof is to provide such a construction which though strong and rigid, is reduced in weight to a minimum and the parts thereof are so correlated as to mutually coact to the best advantage for their intended purposes.

Another object of the invention is to provide a construction of this kind, wherein the brake shoe studs of the braking mechanisms are mounted upon the rear axle itself instead of on the brake drum cover plate so that when the brakes are applied, the shoes do not tend to follow the drum but are firmly anchored, thereby reducing wear and resulting looseness whereby the brakes are more quiet and efficient in operation and have a longer period of usefulness.

A further object of the invention is to so construct the axle so that the center of gravity of the automobile is lowered without sacrificing road clearance at the mid-portion thereof.

Still a further object of the invention is to provide a construction of this kind which readily lends itself to the provision of a jacking lug, so disposed as to be easily accessible when it is desired to apply a jack for elevating one of the wheels as when making a wheel or tire change.

These objects of the invention as well as others, together with the many advantages thereof, will more fully appear as I proceed with my specification.

In the drawings:

Fig. 2 is a longitudinal vertical sectional view through the same as taken on the line 2—2 of Fig 1.

Fig. 3 is a top plan view of the rear axle forging, on an enlarged scale, with the central portion thereof broken away.

Fig. 4 is a transverse vertical sectional view also on an enlarged scale as taken on the line 4—4 of Fig. 1.

Fig. 5 is an end view of the axle and brake drum cover plate as when the associated wheel has been removed and with the brake drum shown in section to better disclose the relation of the braking parts.

Fig. 6 is a transverse vertical section through one end of the axle as taken on the line 6—6 of Fig. 4 and as viewed in the direction of the arrows thereof.

Fig. 7 is a perspective view of a certain jacking lug embodied in the improved construction.

Figure 1:
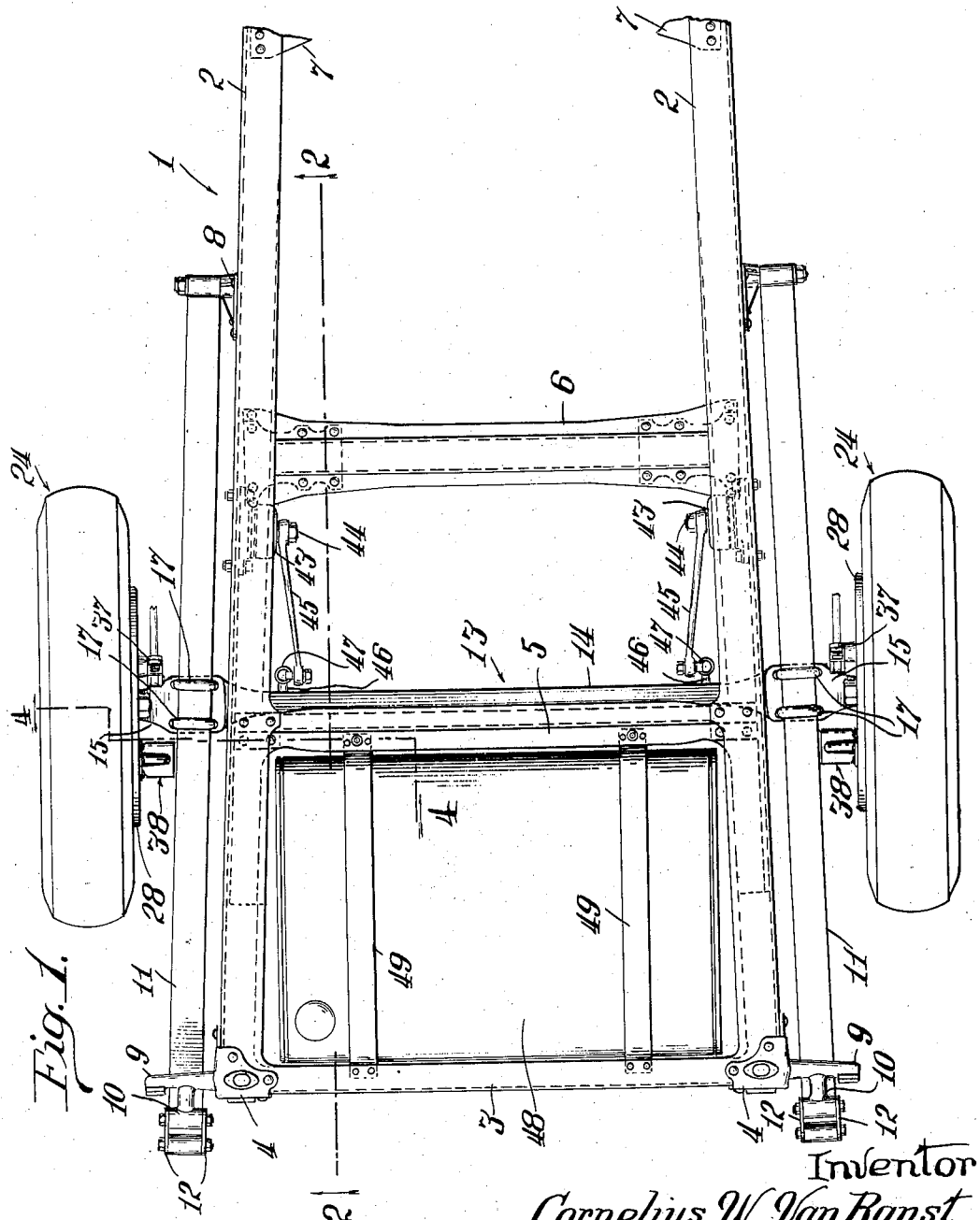
Fig. 1 is a top plan view of the rear end of an automobile chassis embodying one form of my invention.

Referring now in detail to that embodiment of the invention illustrated in the accompanying drawings and especially to Fig. 1 thereof, 1 indicates as a whole the rear end portion of the chassis frame, which includes side members 2—2 and a rear end member 3, all preferably made of channel stock with their top and bottom flanges directed inwardly. As shown herein, the side members 2—2 converge slightly toward the front and are connected to the rear end member by means of corner brackets 4—4. Said side members are further connected together at longitudinally spaced points by cross-bars 5, 6, and 7, respectively, to provide an extremely strong and rigid though light weight chassis frame.

Extending laterally outward from each side frame member 2—2 at a point in advance of the cross member 6 is a spring end receiving bracket 8. Each corner bracket 4 embodies a laterally extending arm 9 which includes a rearwardly facing shackle boss 10. A half elliptic spring 11 has its main leaf operatively connected at the front end to an associated bracket 8 and its rear end to the boss 10 of an associated corner bracket 4 by means of shackle links 12—12.

13 indicates as a whole the rear axle of the automobile. Said axle which is purely a weight bearing, non-driving axle is made of a one piece forging of an I-beam cross section with the major axis of the cross section disposed perpendicularly. This axle includes a central horizontal body portion 14 and a horizontal spring seat portion 15 near each end of the axle disposed in a plane below that of the body portion and connected thereto by means of a reversely curved portion 16. The top flanged part of each seat portion 15 is widened out as at 15ª for the reception of the spring 11, which is secured in position thereon by the usual U-shaped clamping bolts 17 and associated nuts.

At each end of the axle is an upright elongated rectangular plate-like flange 18, the top end of which includes a horizontally disposed boss 19 and said plate-like flange is connected on its rear or inner side to the seat portion by an inclined extension 20 of the seat 15. On the front or outer side of said plate-like flange is a tapering web 21 connecting the underside of the boss to said flange as best shown in Figs. 4 and 6.

Securely fixed in the boss 19, the axis of which is disposed in a plane above that of the central body portion of the axle, is a stub axle or spindle 22. That end of the spindle projecting laterally beyond the boss is formed to receive the hub 23 of a wire wheel 24, suitable inner and outer anti-friction bearings 25 and 26, respectively, being interposed between said spindle and hub. As the specific wheel and hub structure mentioned forms no particular part of the present invention, it will not be described in further detail. There is, however, a brake drum 27 secured to the back flange 23ª of the hub as best shown in Fig. 4.

To close the open inner end of the brake drum, there is provided a brake drum cover plate 28 which has an opening 28ª so that parts of said plate adjacent said opening have a shouldered seat 29 upon said flange and to which said cover plate is welded. At the bottom of said plate-like flange is provided a pair of horizontally spaced bosses 30—30 in each of which is securely anchored a stud 31. Pivoted on each stud adjacent the front or outer face of said plate is the bottom end of one of a pair of internally expanding brake shoes 32—32. At the top of said plate is secured a horizontally disposed hydraulic cylinder 33 operatively connected at each end to the top ends of the brake shoes 32—32. The brake shoes, which are of the internal expanding type, are yieldingly connected together near their top ends by a spring 34 to maintain them normally contracted so that they will not drag upon the brake drum. In the brake drum plate 28, forwardly of the plate-like flange 18 and in a plane below that of the spindle 22, is journaled a rock-shaft 35 and to that end thereof projecting beyond into the brake drum is operatively connected suitable lever and linkage 36 in turn connected to the top ends of the brake shoes. To that end of the rock-shaft spaced inwardly from the brake drum cover plate, is an actuating lever 37 adapted to be operatively connected up to the emergency brake lever of the automobile.

When the cylinder 33 is under hydraulic pressure, the top ends of the brake shoes are moved or expanded outwardly about the studs 31—31 as axes to engage the peripheral band portion of the brake drum in the manner well-known and so soon as this pressure is released, the spring 34 tends to centralize said shoes so that the brake shoes are drawn into their inoperative position. In this respect it is pointed out that when the brake shoes are engaged with the brake drum, they tend to turn with the drum when tightly engaged therewith. Under such conditions, when the brake shoe studs were carried by the cover plate alone, a wear soon takes place at said studs so that a play develops and the brakes will thereafter tend to squeak and chatter. However, in my improved and construction, with the brake shoe pivot studs mounted on a fixed part of the rear axle instead of the cover plate, the studs have no chance for movement and therefore always remain tight so that the shoes positively act without chatter or noise.

It is customary when jacking up a rear wheel of a rear drive automobile to so position the jack as to engage under the tubular housing of the axle in line with or to one side of the spring. To properly position the jack under road-side conditions is quite a task due to the inaccessibility of this axle part. With my improved axle wherein the spring seat portion is quite low, I rivet or otherwise affix to the cover plate 18, to the rear of the axle, a jacking lug or shoulder indicated as a whole at 38. Such a lug is best shown in Fig. 7. Said lug is preferably made from a stamping and includes an upright body 39 and a right angle extension 40 braced from the body by a web 41. The side margins of the extension 40 are turned downwardly to provide shoulders 42—42 thereon. When the body is positioned on and is secured to the brake drum cover plate 28, to the rear of the axle flange as best shown in Fig. 6, the extension 40 thereof projects in toward the adjacent spring 11. Thus, when a jack is positioned with its head beneath said extension and as said jack is actuated, the head will engage under said extension and cannot slip out from beneath the same because of spring and cover plate at the ends thereof and the shoulders 42—42 at the sides thereof. With such a jacking lug and positioned in the manner described, the procedure of jacking up a wheel is indeed made easy and convenient.

The construction thus far described, readily lends itself to the use and convenient arrangement of shock absorbing devices to check undesired movement between the axle and frame. With such an arrangement, I affix to the inner surface of the web of each channel-like side frame member 2—2 between the flanges thereof, at a point forward of the rear axle, the casing 43 of a shock absorbing device, with the shaft 44 thereof projecting inwardly beyond the inner edges of the flanges of the channel-like side frame member. To the shaft 44 of each absorber I secure one end of a lever 45, the other end of which extends rearwardly and slightly inwardly toward the associated reversely curved portion 16 of the rear axle. At each of said axle portions 16 and extending forwardly therefrom is a stud 46 which is connected by a vertically disposed link 47 to the rear end of an associated absorbed lever 45. Thus under road travel, when the springs 11—11 yield as in passing over bumps or into holes, the undesired relative movement between the frame and rear axle is taken up by the absorber through the parts just above described.

In Fig. 1 I have illustrated a fuel tank 48 arranged in position between the cross members 3 and 5 respectively, and operatively supported in position by means of straps 49—49 connecting said cross members.

The construction above described has many advantages. It provides a low center of gravity for the body and reduces unsprung weight. Again the axes for the brake shoes are mounted directly upon the strong and rigid axle instead of the brake drum cover plate so that wear thereon is reduced to a minimum and twisting of the brake drum cover plate is eliminated. The axle is made of a one piece integral forging and is therefore strong and rigid so that it will withstand great loads. Further the jacking lug makes it easy and convenient for positioning a jack when it becomes necessary to jack up one of the wheels thereof.

While in describing my invention, I have referred in detail for the form, arrangement, and construction of the various parts thereof, the same is to be considered merely as illustrative of that embodiment herein shown, so that I do not wish to be limited thereto except as may be specifically pointed out in the appended claim.

I claim as my invention:

1. In an automobile, a wheel having a brake drum, a non-tubular axle including a rigid spindle upon which the wheel is mounted and having an upright end portion adjacent the brake drum, and braking mechanism arranged for cooperation with the brake drum, and including brake shoes pivotally supported upon said upright end portion of said axle.

2. In an automobile, a wheel having a brake drum, a non-tubular axle including a rigid spindle upon which the wheel is mounted and having an upright end portion adjacent the brake drum, braking mechanism arranged for cooperation with the brake drum and including a brake shoe and means secured in said end upright portion of the axle and upon which said brake shoe is operatively engaged.

3. In an automobile, a non-tubular axle having a wheel spindle receiving member and a portion extending downwardly therefrom, in combination with a wheel braking mechanism including a shoe pivotally supported in said downwardly extending axle portion.

4. In an automobile, a non-tubular axle having a wheel spindle receiving member and a portion extending downwardly therefrom, in combination with a wheel braking mechanism including a shoe pivotally supported in said downwardly extending axle portion adjacent its lower end.

5. In an automobile, a non-tubular axle having a rigid wheel spindle receiving member and a portion extending downwardly therefrom and a substantially horizontal portion extending inwardly therefrom, in combination with a braking mechanism including a shoe pivotally supported in said downwardly extending portion in substantially the plane of said inwardly extending horizontal portion which forms a spring seat.

6. In an automobile, a non-tubular axle having a rigid wheel spindle receiving boss and a lower inwardly extending portion connected thereto by a downwardly extending portion, a flange on said last-mentioned portion a brake drum cover plate fixed to said flange and brake shoes cooperating with the brake drum and pivotally supported in said downwardly extending portion.

7. In an automobile, a non-tubular axle having a rigid wheel spindle receiving portion and a second portion extending downwardly therefrom and including a boss, in combination with a wheel braking mechanism including brake shoe pivotally supported upon a stud secured in said boss of said downwardly extending portion.

8. In an automobile, a non-tubular axle having a rigid wheel spindle receiving portion and a second portion extending downwardly therefrom and including a plurality of bosses, in combination with wheel braking mechanism including brake shoes pivotally supported upon studs secured in each boss of said downwardly extending portion.

9. In an automobile, a non-tubular axle having a wheel spindle receiving portion and a second portion extending downwardly therefrom and connected to an inwardly extending horizontal portion, there being a boss on said downwardly extending portion in substantially the plane of said horizontal portion, in combination with wheel braking mechanism including a brake shoe pivotally supported upon a stud secured in said boss of said downwardly extending portion.

10. In an automobile, a non-tubular axle, a rigid wheel spindle operatively connected to an end of said axle, a wheel including a brake drum mounted on the spindle, braking means in said drum and including brake shoes and studs secured in said axle and upon which said shoes are mounted.

In testimony whereof, I have hereunto set my hand, this 28 day of May, 1929.

CORNELIUS W. VAN RANST.